US012179211B2

(12) United States Patent
Lind

(10) Patent No.: US 12,179,211 B2
(45) **Date of Patent: *Dec. 31, 2024**

(54) METHOD AND AN APPARATUS FOR GRINDING MEAT

(71) Applicant: MAREL A/S, Aarhus N (DK)

(72) Inventor: Christian Brochner Lind, Klarup (DK)

(73) Assignee: MAREL A/S, Aarhus (DK)

( * ) Notice: Subject to any disclaimer, the term of this patent is extended or adjusted under 35 U.S.C. 154(b) by 14 days.

This patent is subject to a terminal disclaimer.

(21) Appl. No.: 17/945,502

(22) Filed: Sep. 15, 2022

(65) Prior Publication Data

US 2023/0011892 A1 Jan. 12, 2023

Related U.S. Application Data

(63) Continuation of application No. 16/629,454, filed as application No. PCT/EP2018/068384 on Jul. 6, 2018, now Pat. No. 11,491,491.

(30) Foreign Application Priority Data

Jul. 11, 2017 (DK) .......................... PA 2017 70566

(51) Int. Cl.
*B02C 25/00* (2006.01)
*B02C 18/30* (2006.01)
*B02C 18/38* (2006.01)

(52) U.S. Cl.
CPC .............. *B02C 25/00* (2013.01); *B02C 18/30* (2013.01); *B02C 18/301* (2013.01); *B02C 18/305* (2013.01); *B02C 18/38* (2013.01); *B02C 2018/308* (2013.01)

(58) Field of Classification Search
CPC ........ B02C 25/00; B02C 18/38; B02C 18/301
See application file for complete search history.

(56) References Cited

U.S. PATENT DOCUMENTS 2,042,161 A 5/1936 Satzinger
3,310,086 A 3/1967 Lasar
4,512,523 A 4/1985 Higashimoto
(Continued)

FOREIGN PATENT DOCUMENTS

CN 103056009 A 4/2013
DE 2812536 A1 † 9/1979
(Continued)

OTHER PUBLICATIONS

Danish Search Report from Application No. PA 201770566, Dec. 1, 2017.

(Continued)

*Primary Examiner* — Faye Francis
(74) *Attorney, Agent, or Firm* — Workman Nydegger

(57) ABSTRACT

A method to grind meat in a grinder, includes: providing the meat to the grinder via a hopper where the hopper includes a feeder worm for feeding the meat to a process unit. The process unit has a rotating processing worm and a cutting set. The rotating processing worm can receive the meat from the feeder worm and convey it to the cutting set, which grinds the meat. The method involves automatically adjusting the revolutions per minute of the rotating processing worm in response to a pressure creation in the process unit.

15 Claims, 2 Drawing Sheets

(56) References Cited

U.S. PATENT DOCUMENTS

| | | | |
|---|---|---|---|
| 8,584,978 B2 | 11/2013 | Lesar et al. |
| 9,089,147 B2 | 7/2015 | Maile |
| 10,111,444 B2 | 10/2018 | Metcalf et al. |
| 2004/0149841 A1 | 8/2004 | Linn et al. |
| 2012/0207566 A1 | 8/2012 | Maile |
| 2012/0286077 A1 | 11/2012 | York |
| 2017/0007063 A1 | 1/2017 | Maier et al. |
| 2020/0197948 A1 | 6/2020 | Van Beers |

FOREIGN PATENT DOCUMENTS

| | | | | |
|---|---|---|---|---|
| DE | 3032934 | A1 | | 4/1982 |
| DE | 19518390 | A1 | | 11/1996 |
| DE | 202005019152 | U1 | | 5/2006 |
| EP | 0573759 | A1 | † | 12/1993 |
| EP | 0573759 | B1 | | 7/1997 |
| EP | 1870162 | A2 | † | 12/2007 |
| EP | 2489273 | A1 | | 8/2012 |
| WO | 2015/091666 | A1 | † | 6/2015 |
| WO | 2017/009282 | A1 | † | 1/2017 |

OTHER PUBLICATIONS

International Search Report and Written Opinion from PCT Application No. PCT/EP2018/068384, Aug. 21, 2018.
“Automatic Grinders,” Seydelmann, at least as early as Dec. 31, 2008.
“Industrial Grinders,” Seydelmann, at least as early as Dec. 31, 2012.
“Mixing Grinders,” Seydelmann, at least as early as Dec. 31, 2003.
“Softwaredokumentation Wolf,” Karl Schnell GmbH, Mar. 12, 2013.
“KS Automatic Grinder,” Karl Schnell GmbH, Jan. 1, 2013.
“Software Documentation Cheese line,” Karl Schnell GmbH, Dec. 12, 2013.

† cited by third party

METHOD AND AN APPARATUS FOR GRINDING MEAT

This application is a continuation application of U.S. patent application Ser. No. 16/629,454, filed Jan. 8, 2020, now U.S. Pat. No. 11,491,491 issued Oct. 19, 2022. This application has foreign application priority to PA 2017 70566 (Denmark) of Jul. 11, 2017.

FIELD OF THE INVENTION

The present invention relates to a method of grinding meat, and to a meat grinder for grinding meat.

BACKGROUND OF THE INVENTION

Meat grinders utilized to produce minced meat exist. In the most commonly used meat grinders the meat is provided to the grinder via a hopper and transported by a feeder worm to a rotating processing worm which conveys the meat towards a cutting set which grinds the meat. The meat that is fed into such grinders can be fresh meat with different lean/fat ratio or frozen meat blocks, or a combination thereof.

When frozen meat blocks is to be ground, and especially if the frozen meat blocks have high lean/fat ratios, the grinders can shut down due to too much load. Obviously, this reduces the profitability of a meat grinding plant and results in high maintenance costs.

Such meat grinders run at a fixed rpm, and to overcome the power needed to grind such a frozen block, the grinders are replaced with grinders having a gearbox that run at lower rpm. The most powerful grinders run at 102 rpm 50 Hz, which gives 8500 Nm. However, such powerful grinders are both costly, and more importantly result in lower capacity when soft/fresh meat is to be grinded due to the lower rpm.

Moreover, the infeed into such grinders commonly occurs at two opposite sides of the grinders, where, on one side, a frozen meat is fed into the meat grinders by a first infeed device operated by an operator, and where on the other side, a fresh meat is feed by a second infeed device operated by e.g. another operator. Such infeed methods can lead to accidents where some of the meat being fed from one side may fall out from the grinder on the opposite side where an operator may be present and thus be injured.

Such grinders are also commonly provided with bone/sinew/gristle separator system that reduces the amount of bones/sinews/gristles to be grinded and are instead bypassed before being grinded. Such bone/sinew/gristle separator systems are provided with a valve that is manually opened to allow said bypass from the grinder, and manually closed when frozen meat is grinded.

This has however the drawback that the operator may mistakenly open the valve when it is supposed to be closed (frozen meat) which may damage the grinder, and close the valve when it is supposed to be open which reduces the quality of the grinded meat due to too large amount of bone/sinew/gristle in the grinded meat.

SUMMARY OF THE INVENTION

On the above background it is an object of embodiments of the present invention to provide a method of grinding meat and a meat grinder that at all times is prevented from being overloaded and at the same time has a high capacity.

In general, the invention preferably seeks to mitigate, alleviate or eliminate one or more of the above mentioned disadvantages of the prior art singly or in any combination. In particular, it may be seen as an object of embodiments of the present invention to provide a meat grinder that solves the above mentioned problems, or other problems.

To better address one or more of these concerns, in a first aspect of the invention, a method is provided to grind meat in a grinder, comprising:

- providing the meat to the grinder via a hopper where the hopper includes a feeder worm for feeding the meat to a process unit, where the process unit comprises a rotating processing worm and a cutting set, the rotating processing worm being configured to receive the meat from the feeder worm and convey it to the cutting set which grinds the meat,
- wherein the method further comprises:
- automatically adjusting the revolutions per minute (RPM) of the rotating processing worm in response to a pressure creation in the process unit.

Said automatic adjustment of the revolutions per minute (RPM) of the rotating processing worm in response to a pressure creation in the process unit allows the grinder to operate as if it has a gearbox that automatically reacts on the pressure creation in the process unit and allows the meat grind to run optimally and simultaneously with high throughput. Also, this enhances the lifetime of the cutting set.

Said cutting set may be understood as a space extension (knife housing) of the process unit, both having cylindrical shape, where at least one knife is present therein having a diameter close to an inner diameter of the space extension and at least one hole-plate arranged downstream of the at least one knife, where the sizes of holes in the at least one hole-plate is preferably determined from the final product that is required. Such a set of knife and hole-plate may be repeated several times. As an example, said cutting set may comprise a double knife set, and a first hole-plate and a final hole-plate, where the sizes of the holes in the first hole-plate may be determined by the product conditions and the hole-size in the final-hole-plate.

Said feeder worm may according to the present invention be understood as a pre-breaker screw that roughly grinds the meat, and leads the products to the rotating processing worm that presses the product through the cutting set (knife housing and the hole-plate).

In one embodiment, the step of adjusting the RPM of the rotating processing worm comprises either increasing or decreasing the RPM while remaining the conveying direction of the rotating processing worm. As an example, under normal conditions such a meat grinder runs approx. 125 rpm approx. 60 Hz Torque app. 4500 Nm. If the product is e.g. hard to grind then accordingly the frequency will automatically be adjusted to e.g. 50 Hz (or below) while running at 102 rpm giving the maximum torque of around 8500 Nm. Via such an automatic operation, the rotating processing worm has an optimal torque at all times. If on the other hand the pressure creation is reduced, e.g. now fresh meat is fed into the meat grinder, the frequency will automatically be increased again and thus the capacity will be maximized.

In one embodiment, the step of adjusting the RPM of the rotating processing worm comprises reducing the RPM down to zero followed by temporarily reversing the direction of rotation of the rotating processing worm. This is of particular advantage if a high pressure creation/load is still detected on the processing worm when running at e.g. 50 Hz, then through said temporal reversing it is ensured that the pressure creation is overcome.

In one embodiment, the temporal reversing is applied for a pre-defined time period, subsequently followed by a full power operation of the processing worm. Said step of temporal reversing followed by a full power operation of the processing worm is in one embodiment repeated until the pressure creation in the process unit is below a pressure target value. With such a sequential operation the meat grinder according to the present invention increases the throughput compared to a conventional meat grinder.

In one embodiment, the pressure created in the process unit is detected by the power consumption of the motor device driving the rotating processing worm. In another embodiment, the pressure created in the process unit is measured by a pressure sensor.

In one embodiment, the pressure sensor is positioned in the vicinity of the cutting set. It is thus possible to adjust the rpm so as to maximize the quality of the grinded meat e.g. to prevent it from overheating.

In one embodiment, the pressure creation in the process unit is utilized as an indicator in distinguishing between whether the meat is frozen meat or fresh meat. There is a direct link between the pressure and whether the meat is fresh or frozen. In the former case the pressure is lower compared to the latter where the pressure is higher. Thus, if e.g. the pressure is below a certain pre-selected limit (e.g. based on tests, calibration etc.), the pressure signal is used as an indicator which indicates that the meat is fresh meat. On the other hand, if the pressure is above a certain pre-selected limit, e.g. said pre-selected limit for fresh meat, the pressure signal is used as an indicator which indicates that the meat is frozen.

In one embodiment, the grinder further comprises a bone/sinew/gristle separator system connected to the process unit by a valve operated by a control until, where operating the valve comprises:

- opening the valve if the presence of fresh meat in the process unit is detected thus allowing removing bone and/or/sinew and/or gristle from the process unit,
- closing the valve if the presence of frozen meat in the process unit is detected.

Such a bone/sinew/gristle separator system is well know to a person skilled in the art and commonly extends from an opening in the vicinity of the cutting set where, during the grinding of the meat, the bone/sinew/gristle are pushed radially away and towards the opening where it is bypassed from the process unit. However, this is only possible if the meat is fresh where the valve is kept open, and not if it is frozen where the valve is to be closed.

Thus, by operating said valve in such an automatic way, it is ensured that the valve is open at the right time and mistakes of manually opening the valve when it is supposed to be closed, and vice versa, closing it when it is supposed to be open, are prevented. This will not only prevents damages in the grinder, but also provides a higher quality in the grinded meat since a minimal amount of bone/sinew/gristle will pass through the cutting set and be grinded.

In one embodiment, the infeed of said meat into said hopper is performed by a single infeed device. This may, as an example, be a conveyor apparatus that may feed a mix of fresh and frozen meat from one and the same infeed position, or a lifting device that feeds the meat from only one side of the grinder, where fresh and frozen meat are fed from one and the same location. Thus, it is prevented that accidents originating from infeed from two sides of the grinder occur.

In a second aspect of the invention, a meat grinder is provided for grinding meat, comprising:

- a hopper configured to receive the meat,
- a feeder worm comprised in the hopper for feeding the meat to a process unit, where the process unit comprises a rotating processing worm and a cutting set, the rotating processing worm being configured to receive the meat from the feeder worm and for conveying it to the cutting set which grinds the meat, wherein the meat grinder further comprises:

- a control unit configured to automatically adjust the revolutions per minute (RPM) of the rotating processing worm in response to a pressure creation in the process unit.

Accordingly, an highly advanced grinder is provided that allows the grinder to operate as if it has a gearbox that automatically reacts on the pressure creation in the process unit and allows the meat grinding process to run optimally and simultaneously with high throughput.

In one embodiment, the grinder further comprises a bone/sinew/gristle separator system connected to the process unit via a valve which is operated by a control unit in response to the pressure creation in the process unit, where the pressure creation is utilized in distinguishing whether the meat is a frozen meat or a fresh meat, where the control unit is configured to open the valve if the presence of fresh meat in the process unit is detected thus allowing removing bone and/or/sinew and/or gristle from the process unit, and close the valve if the presence of frozen meat in the process unit is detected.

In one embodiment, the grinder further comprises an infeed device for feeding said meat into said hopper from a single location. The infeed device may, in one embodiment, be selected from: a conveyor apparatus positioned above said hopper, or a lifting infeed apparatus for receiving the meat in a first position, followed by lifting the meat from the first position upwards and along the grinder followed by shoveling the meat into said hopper.

BRIEF DESCRIPTION OF THE DRAWINGS

Embodiments of the invention will be described, by way of example only, with reference to the drawings, in which.

DESCRIPTION OF EMBODIMENTS

Figure 1:
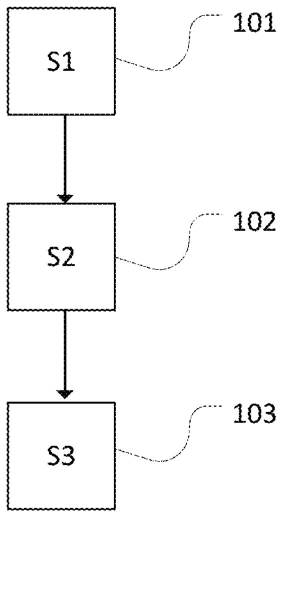
FIG. 1 shows a flowchart of a method according to the present invention.

FIG. 1 shows a flowchart of an embodiment of a method according to the present invention, i.e. a method to grind meat in a grinder.

In step (S1) 101, a meat is provided to the grinder via a hopper where the hopper includes a feeder worm for feeding the meat to a process unit, where the process unit comprises a rotating processing worm and a cutting set, the rotating processing worm being configured to receive the meat from the feeder worm and convey it to the cutting set which grinds the meat.

In step (S2) 102, the revolutions per minute (RPM) of the rotating processing worm is automatically adjusted in response to a pressure creation in the process unit.

In an embodiment, the step of automatically adjusting the RPM of the rotating processing worm comprises either increasing or decreasing the RPM while remaining the conveying direction of the rotating processing worm. A common "normal" working conditions of such a meat grinder is to run at approx. 125 rpm approx. 60 Hz Torque app. 4500 Nm. Accordingly, if the product is a frozen meat clump having e.g. high lean/fat ratio, which is very difficult to grind, then according to the present invention, the frequency will automatically be adjusted to e.g. 50 Hz (or below) while running at 102 rpm, which increases the torque to a maximum torque, of around 8500 Nm. Via such an automatic operation the rotating processing worm has an optimal torque at all times. If on the other hand the pressure creation is reduced, e.g. now a fresh meat is fed into the meat grinder, the frequency will automatically be increased again and thus the capacity will be maximized.

In another embodiment, the step of adjusting the RPM of the rotating processing worm comprises reducing the RPM down to zero followed by temporarily reversing the direction of rotation of the rotating processing worm. The load pressure is commonly highest at the vicinity of the cutting set, but results have shown that by temporarily reversing the rotating processing worm in an automatic way, such an overload may be overcome. The temporal reversing may, in one embodiment, be applied for a pre-defined time period, subsequently followed by a full power operation of the processing worm. This may be repeated until the pressure creation in the process unit is below a pressure target value.

Said pressure creation may be detected by the power consumption of the motor device driving the rotating processing worm, and/or be measured by a pressure sensor, where the pressure sensor is positioned in the vicinity of the cutting set.

In one embodiment, the present invention further comprises a step (S3) 103, namely to adjust the rpm and thus the torque of the rotating processing worm so as maintain an optimal pressure at the cutting set and so as to maintain an optimal quality of the grinded meat.

Figure 2:
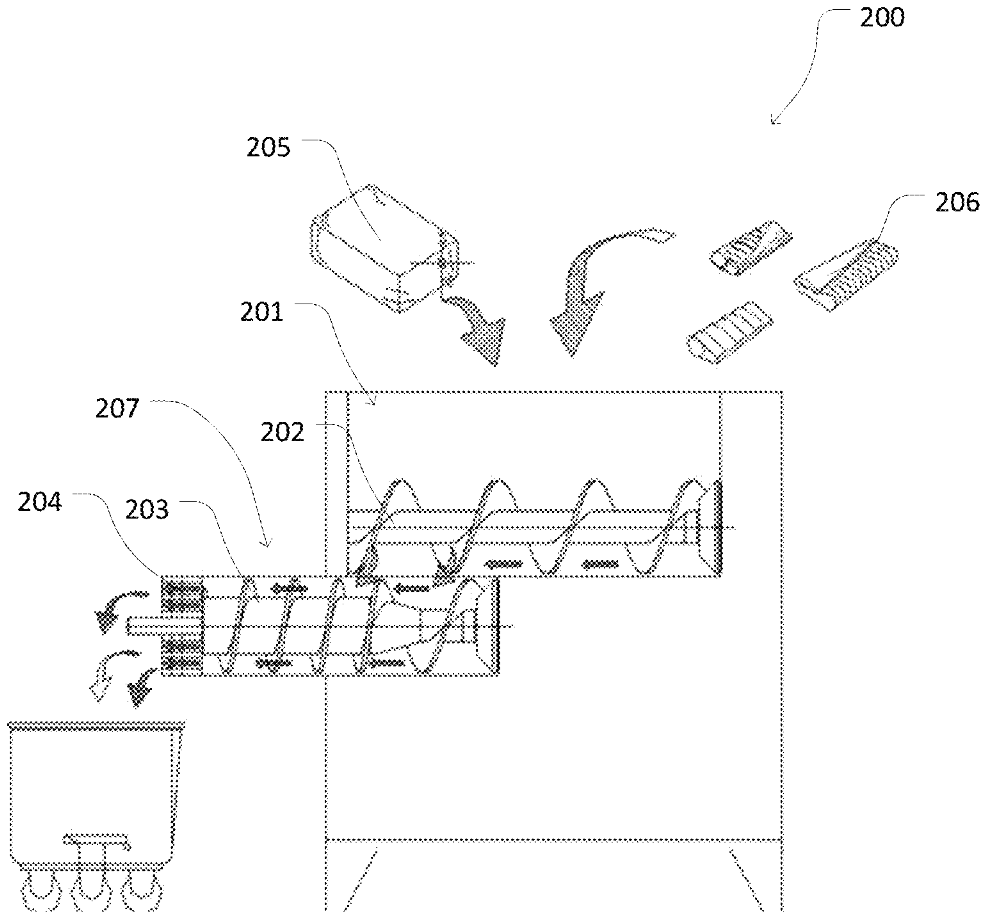
FIG. 2 shows an embodiment of a meat grinder according to the present invention.

FIG. 2 shows a meat grinder 200 for grinding meat 205, 206, comprising a hopper 201 configured to receive the meat to the grinder, a feeder worm 202 comprised in the hopper for feeding the meat to a process unit 207. The process unit comprises a rotating processing worm 203 and a cutting set 204, the rotating processing worm being configured to receive the meat from the feeder worm and convey it to the cutting set which grinds the meat. The meat grinder further comprises a control unit configured to automatically adjust the revolutions per minute (RPM) of the rotating processing worm in response to a pressure creation in the process unit. The cutting set 204 may also be referred to as a knife housing comprising repetition of at least one rotating knife and at least one of the hole-plates arranged downstream of the rotating knife.

Figure 3:
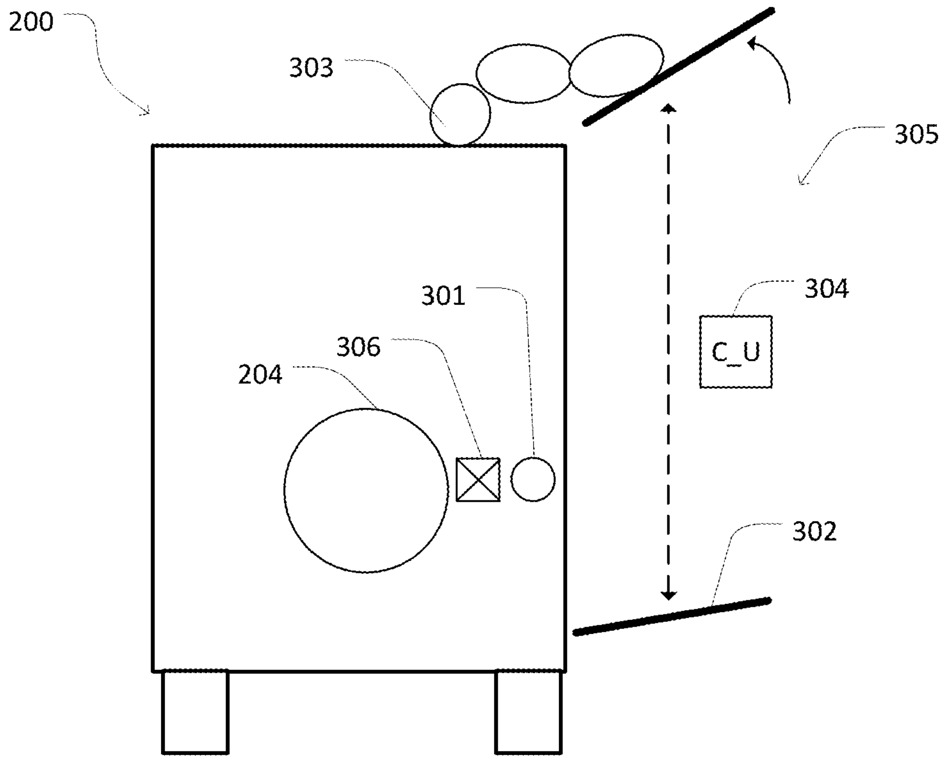
FIG. 3 shows a simplified cross sectional view of the grinder in FIG. 2 with a bone/sinew/gristle separator system.

FIG. 3 shows a simplified cross sectional view of the grinder 200 in FIG. 2, where the infeed of the meat into the grinder occurs on one side of the grinder. In the embodiment shown here, a lifting infeed apparatus 305 is provided comprising a shovel like device 302 where meat is received in e.g. combos. Instructions may be received by a control unit 304 for lifting the shovel like device 302 upwards followed by shoveling the meat 303 into the grinder.

In the embodiment shown here, the grinder further comprises a bone/sinew/gristle separator system 301 connected to the cutting set 204 via a valve 306 operated by a control unit 304 in response to the pressure creation in the process unit. The pressure creation is utilized in distinguishing whether the meat is a frozen meat or a fresh meat, where the control unit is configured to open the valve if the presence of fresh meat in the process unit is detected thus allowing removing bone and/or/sinew and/or gristle from the process unit, and closing the valve if the presence of frozen meat in the process unit is detected.

Figure 4:
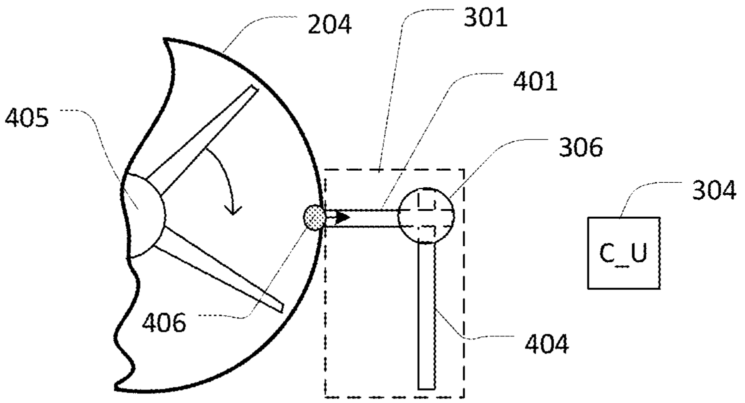
FIG. 4 depicts a zoomed up view of one embodiment of such a bone/sinew/gristle separator system.

FIG. 4 shows a zoomed up view of the bone/sinew/gristle separator system 301 arranged in proximity of a rotating knife 405, showing a first hollow rod 401 (or similar) extending from an opening in the cutting set, where said valve 306 may be in an open position (if meat is fresh meat) thus allowing it to pass there through and to a second hollow rod 404 where the bones/sinews/gristles are passed there through.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method to grind meat in a grinder, comprising:

providing the meat to the grinder via a hopper where the hopper includes a feeder worm for feeding the meat to a process unit, where the process unit comprises a rotating processing worm and a cutting set, the rotating processing worm being configured to receive the meat from the feeder worm and convey it to the cutting set which grinds the meat, and automatically adjusting revolutions per minute (RPM) of the rotating processing worm in response to a pressure creation in the process unit;

wherein the pressure created in the process unit is measured by a pressure sensor.

2. The method according to claim 1, wherein the step of adjusting the RPM of the rotating processing worm comprises either increasing or decreasing the RPM while continuing a conveying direction of the rotating processing worm.

3. The method according to claim 1, wherein the step of adjusting the RPM of the rotating processing worm comprises reducing the RPM down to zero followed by temporarily reversing a direction of rotation of the rotating processing worm.

4. The method according to claim 3, wherein the temporal reversing is applied for a pre-defined time period, subsequently followed by a full power operation of the processing worm.

5. The method according to claim 4, wherein the step of temporal reversing followed by a full power operation of the processing worm is repeated until the pressure creation in the process unit is below a pressure target value.

6. The method according to claim 1, wherein the pressure created in the process unit is detected by a power consumption of a motor device driving the rotation processing worm.

7. The method according to claim 1, wherein the pressure sensor is positioned in a vicinity of the cutting set.

8. A method to grind meat in a grinder, comprising:

providing the meat to the grinder via a hopper where the hopper includes a feeder worm for feeding the meat to a process unit, where the process unit comprises a rotating processing worm and a cutting set, the rotating processing worm being configured to receive the meat from the feeder worm and convey it to the cutting set which grinds the meat, and automatically adjusting revolutions per minute (RPM) of the rotating processing worm in response to a pressure creation in the process unit;

wherein the method further comprises:

wherein pressure creation in the process unit is utilized as an indicator in distinguishing between whether the meat is a frozen meat or a fresh meat;

wherein the pressure created in the process unit is measured by a pressure sensor.

9. The method according to claim 8, wherein the grinder further comprises a bone/sinew/gristle separator system connected to the cutting set by a valve operated by a control until, where operating the valve comprises:

opening the valve if a presence of fresh meat in the process unit is detected thus allowing removing bone and/or/sinew and/or gristle from the process unit, closing the valve if the presence of frozen meat in the process unit is detected.

10. The method according to claim 1, wherein an infeed of said meat into said hopper is performed by a single infeed device.

11. The method according to claim 8, wherein the pressure created in the process unit is also detected by a power consumption of a motor device driving the rotation processing worm.

12. A meat grinder for grinding meat, comprising:

a hopper configured to receive the meat, a feeder worm comprised in the hopper for feeding the meat to a process unit, where the process unit comprises a processing worm configured to rotate, and a cutting set, the rotatable processing worm being configured to receive the meat from the feeder worm and convey it to the cutting set which grinds the meat, a control unit configured to automatically adjust revolutions per minute (RPM) of the rotatable processing worm in response to a pressure creation in the process unit, and a bone/sinew/gristle separator system connected to the process unit via a valve, the valve operated by a control unit in response to the pressure creation in the process unit, where the pressure creation is utilized in distinguishing whether the meat is a frozen meat or a fresh meat, where the control unit is configured to open the valve when a presence of fresh meat in the process unit is detected thus allowing removing bone and/or/sinew and/or gristle from the process unit, and closing the valve if the presence of frozen meat in the process unit is detected;

wherein the pressure created in the process unit is measured by a pressure sensor.

13. The meat grinder according to claim 12, further comprising an infeed device for feeding said meat into said hopper from a single location.

14. The meat grinder according to claim 13, wherein the infeed device is selected from:

a conveyor apparatus positioned above said hopper, or a lifting infeed apparatus for receiving the meat in a first position, followed by lifting the meat from the first position upwards and along the grinder followed by shoveling the meat into said hopper.

15. The meat grinder according to claim 12, wherein the pressure created in the process unit is also detected by a power consumption of a motor device driving the rotation processing worm.

* * * * *